US012292007B2

(12) United States Patent
Farah

(10) Patent No.: US 12,292,007 B2
(45) Date of Patent: May 6, 2025

(54) HYDROGEN LEAK DETECTION SYSTEM FOR AN AIRCRAFT PROPULSION SYSTEM

(71) Applicant: Pratt & Whitney Canada Corp., Longueuil (CA)

(72) Inventor: Assaf Farah, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/371,876

(22) Filed: Sep. 22, 2023

(65) Prior Publication Data
US 2025/0101923 A1   Mar. 27, 2025

(51) Int. Cl.
*F02C 9/28*    (2006.01)
*B64D 45/00*   (2006.01)
*F02D 41/22*   (2006.01)
*G01M 3/32*    (2006.01)

(52) U.S. Cl.
CPC ............... *F02C 9/28* (2013.01); *B64D 45/00* (2013.01); *F02D 41/22* (2013.01); *G01M 3/3263* (2013.01); *B64D 2045/0085* (2013.01); *F02D 2041/225* (2013.01)

(58) Field of Classification Search
CPC .......... F17C 2260/035; F17C 2260/038; F02D 2041/225; F02C 7/22; F02C 7/224; F02C 7/232
See application file for complete search history.

(56) References Cited

U.S. PATENT DOCUMENTS

| | | | |
|---|---|---|---|
| 9,857,266 B2* | 1/2018 | Tseng | F02D 41/22 |
| 11,332,835 B2 | 5/2022 | Yakumaru | |
| 11,332,836 B2 | 5/2022 | Yakumaru | |
| 11,499,494 B1* | 11/2022 | Lee | B60K 15/077 |
| 11,846,568 B2* | 12/2023 | Shenouda | B64D 37/32 |
| 2011/0240896 A1* | 10/2011 | Young | F02M 25/0836 |
| | | | 123/521 |
| 2012/0305430 A1* | 12/2012 | Jaeger | H01M 8/04201 |
| | | | 206/459.1 |

(Continued)

OTHER PUBLICATIONS

EP Search Report for EP Patent Application No. 24202000.6 dated Jan. 31, 2025.

*Primary Examiner* — Thuyhang N Nguyen
(74) *Attorney, Agent, or Firm* — Getz Balich LLC

(57) ABSTRACT

A hydrogen supply assembly for an aircraft propulsion system includes a storage housing, a hydrogen supply component, and a leak detection system. The storage housing surrounds and forms a storage plenum. The hydrogen supply component is disposed within the storage housing coincident with the storage plenum. The leak detection system includes an interior pressure sensor, an exterior pressure sensor, and a controller. The interior pressure sensor is connected in fluid communication with the storage plenum. The exterior pressure sensor is connected in fluid communication with an ambient atmosphere outside the storage housing. The controller is configured to determine a differential pressure between the storage plenum and the ambient atmosphere with the interior pressure sensor and the exterior pressure sensor and identify a presence or an absence of hydrogen leakage from the hydrogen supply component to the storage plenum by comparing the determined differential pressure to a first differential pressure threshold.

18 Claims, 3 Drawing Sheets

(56) References Cited

U.S. PATENT DOCUMENTS

| | | | |
|---|---|---|---|
| 2017/0067578 A1* | 3/2017 | Hoffman | G01M 3/2876 |
| 2019/0055905 A1* | 2/2019 | Dudar | F02D 41/004 |
| 2022/0373134 A1 | 11/2022 | Sinding | |
| 2022/0397479 A1 | 12/2022 | Shenouda | |
| 2023/0160773 A1* | 5/2023 | Berg | G01M 3/2876 73/40 |
| 2023/0294838 A1 | 9/2023 | Gaikwad | |

\* cited by examiner

HYDROGEN LEAK DETECTION SYSTEM FOR AN AIRCRAFT PROPULSION SYSTEM

TECHNICAL FIELD

This disclosure relates generally to aircraft propulsion systems and, more particularly, to hydrogen leak detection systems for aircraft propulsion systems.

BACKGROUND OF THE ART

Some propulsion systems for aircraft may engines configured for combustion using hydrogen or a combination of hydrogen and other fuels. Hydrogen used by an aircraft propulsion system can require complex storage and supply equipment to address hydrogen leakage and other safety considerations. Various systems are known in the art for storing hydrogen on board aircraft as well as other locations. While these known systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a hydrogen supply assembly for an aircraft propulsion system includes a storage housing, a hydrogen supply component, and a leak detection system. The storage housing surrounds and forms a storage plenum. The hydrogen supply component is disposed within the storage housing coincident with the storage plenum. The leak detection system includes an interior pressure sensor, an exterior pressure sensor, and a controller. The interior pressure sensor is connected in fluid communication with the storage plenum. The exterior pressure sensor is connected in fluid communication with an ambient atmosphere outside the storage housing. The controller includes a processor in communication with a non-transitory memory storing instructions, which instructions when executed by the processor, cause the processor to determine a differential pressure between the storage plenum and the ambient atmosphere with the interior pressure sensor and the exterior pressure sensor and identify a presence or an absence of hydrogen leakage from the hydrogen supply component to the storage plenum by comparing the determined differential pressure to a first differential pressure threshold. The presence of hydrogen leakage is identified by the determined differential pressure greater than or equal to the differential pressure threshold.

In any of the aspects or embodiments described above and herein, the instructions, when executed by the processor, may further cause the processor to generate a warning in response to identifying the presence of the hydrogen leakage from the hydrogen supply component to the storage plenum.

In any of the aspects or embodiments described above and herein, the leak detection system may further include a purge assembly including a control valve. The control valve may be connected in fluid communication with the storage plenum. The control valve may be positionable in a closed position and an open position. The control valve is configured to purge the storage plenum in the open position.

In any of the aspects or embodiments described above and herein, the controller may be connected in communication with the control valve. The instructions, when executed by the processor, may further cause the processor to control the control valve in the open position to purge the storage plenum when the determined differential pressure is greater than a second differential pressure threshold.

In any of the aspects or embodiments described above and herein, the second differential pressure threshold may be greater than the first differential pressure threshold.

In any of the aspects or embodiments described above and herein, the instructions, when executed by the processor, may further cause the processor to generate a prompt for an operator to open the control valve to purge the storage plenum when the determined differential pressure is greater than a second differential pressure threshold.

In any of the aspects or embodiments described above and herein, the hydrogen supply component may include at least one hydrogen storage vessel.

In any of the aspects or embodiments described above and herein, the interior pressure sensor and the exterior pressure sensor may be mounted to the storage housing.

According to another aspect of the present disclosure, a propulsion system for an aircraft includes an engine, a storage housing, at least one hydrogen storage vessel, and a leak detection system. The engine includes a combustor. The storage housing surrounds and forms a storage plenum. The at least one hydrogen storage vessel is disposed within the storage housing coincident with the storage plenum. The at least one hydrogen storage vessel is configured to supply hydrogen from the at least one hydrogen storage vessel to the combustor for combustion. The leak detection system includes a differential pressure sensor and a controller. The differential pressure sensor is configured to measure a differential pressure between the storage plenum and an ambient atmosphere outside the storage housing. The controller includes a processor in communication with a non-transitory memory storing instructions, which instructions when executed by the processor, cause the processor to determine the differential pressure between the storage plenum and the ambient atmosphere and identify a presence or an absence of hydrogen leakage from the hydrogen supply component to the storage plenum by comparing the determined differential pressure to a first differential pressure threshold. The presence of hydrogen leakage is identified by the determined differential pressure greater than or equal to the differential pressure threshold.

In any of the aspects or embodiments described above and herein, the instructions, when executed by the processor, may further cause the processor to generate a warning for a pilot of the aircraft in response to identifying the presence of the hydrogen leakage from the hydrogen supply component to the storage plenum.

In any of the aspects or embodiments described above and herein, the leak detection system may further include a purge assembly including a control valve and a purge conduit. The control valve may be connected in fluid communication with the storage plenum. The control valve may be positionable in a closed position and an open position. The control valve may be configured to purge the storage plenum in the open position through the purge conduit.

In any of the aspects or embodiments described above and herein, the purge conduit may be configured to purge the storage plenum to an exterior of the propulsion system or the aircraft.

In any of the aspects or embodiments described above and herein, the instructions, when executed by the processor, may further cause the processor to generate a prompt for a pilot of the aircraft to open the control valve to purge the storage plenum when the determined differential pressure is greater than a second differential pressure threshold.

In any of the aspects or embodiments described above and herein, the second differential pressure threshold may be greater than the first differential pressure threshold.

According to another aspect of the present disclosure, a hydrogen supply assembly for an aircraft propulsion system includes a storage housing, a hydrogen supply component, and a leak detection system. The storage housing surrounds and forms a storage plenum. The hydrogen supply component is disposed within the storage housing coincident with the storage plenum. The leak detection system includes an interior pressure sensor, an exterior pressure sensor, and a purge assembly. The interior pressure sensor is connected in fluid communication with the storage plenum. The exterior pressure sensor is connected in fluid communication with an ambient atmosphere outside the storage housing. The purge assembly includes a control valve. The control valve is connected in fluid communication with the storage plenum. The control valve is positionable in a closed position and an open position. The control valve is configured to purge the storage plenum in the open position.

In any of the aspects or embodiments described above and herein, the hydrogen supply component may include at least one hydrogen storage vessel.

In any of the aspects or embodiments described above and herein, the interior pressure sensor and the exterior pressure sensor may be mounted to the storage housing.

In any of the aspects or embodiments described above and herein, the leak detection system may further include a controller. The controller may be connected in communication with the control valve. The controller may include a processor in communication with a non-transitory memory storing instructions, which instructions when executed by the processor, may cause the processor to determine a differential pressure between the storage plenum and the ambient atmosphere with the interior pressure sensor and the exterior pressure sensor and control the control valve in the open position to purge the storage plenum when the determined differential pressure is greater than a differential pressure threshold.

In any of the aspects or embodiments described above and herein, the leak detection system may further include a controller. The controller may be connected in communication with the control valve. The controller may include a processor in communication with a non-transitory memory storing instructions, which instructions when executed by the processor, may cause the processor to determine a differential pressure between the storage plenum and the ambient atmosphere with the interior pressure sensor and the exterior pressure sensor and generate a prompt for an operator to open the control valve to purge the storage plenum when the determined differential pressure is greater than a differential pressure threshold.

In any of the aspects or embodiments described above and herein, the control valve may be configured to purge the storage plenum to the ambient atmosphere in the open position.

The present disclosure, and all its aspects, embodiments and advantages associated therewith will become more readily apparent in view of the detailed description provided below, including the accompanying drawings.

DETAILED DESCRIPTION

Figure 1:
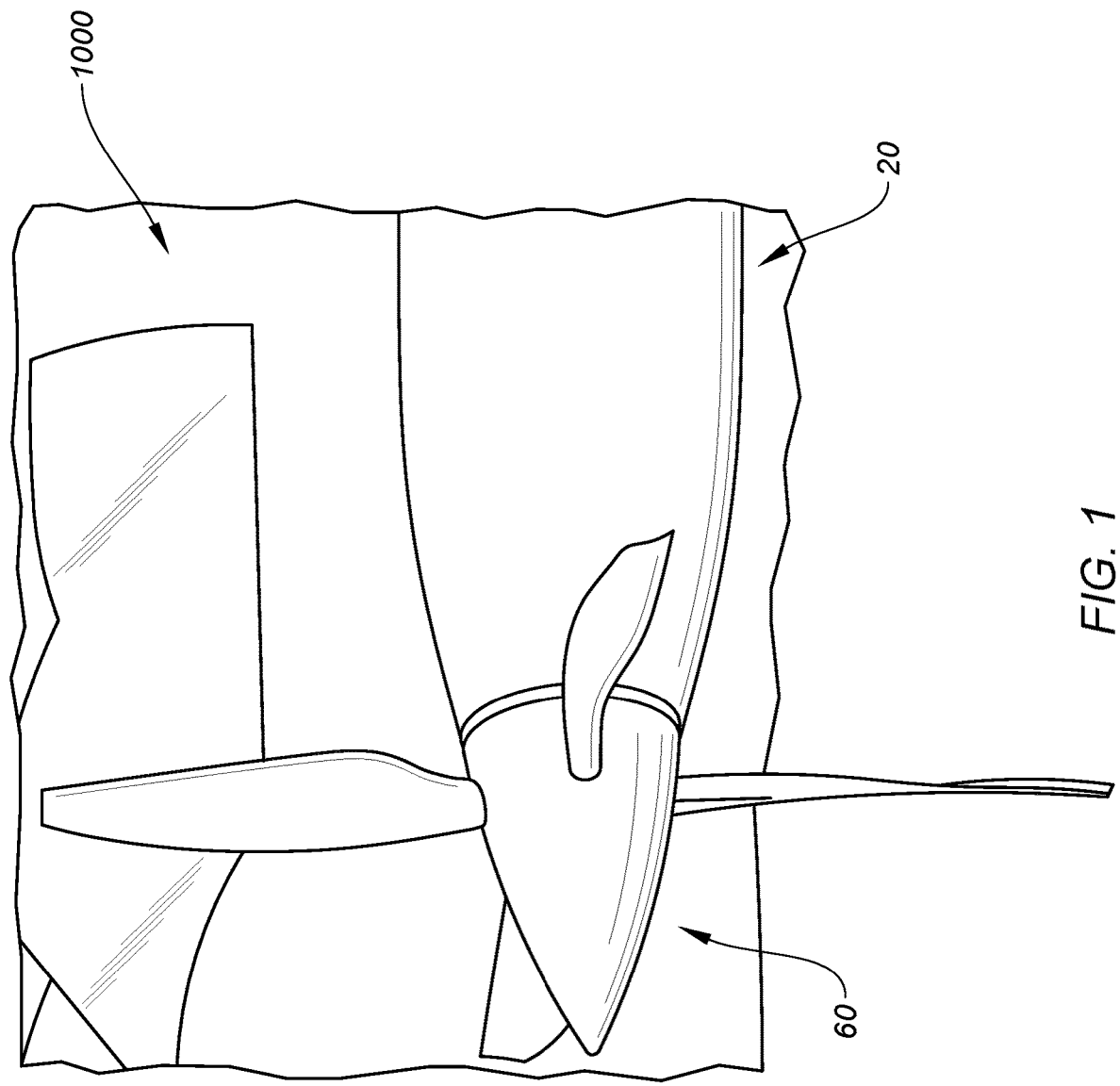
FIG. 1 illustrates a perspective view of a portion of an aircraft including a propulsion system, in accordance with one or more embodiments of the present disclosure.

FIG. 1 illustrates an aircraft 1000 including a propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
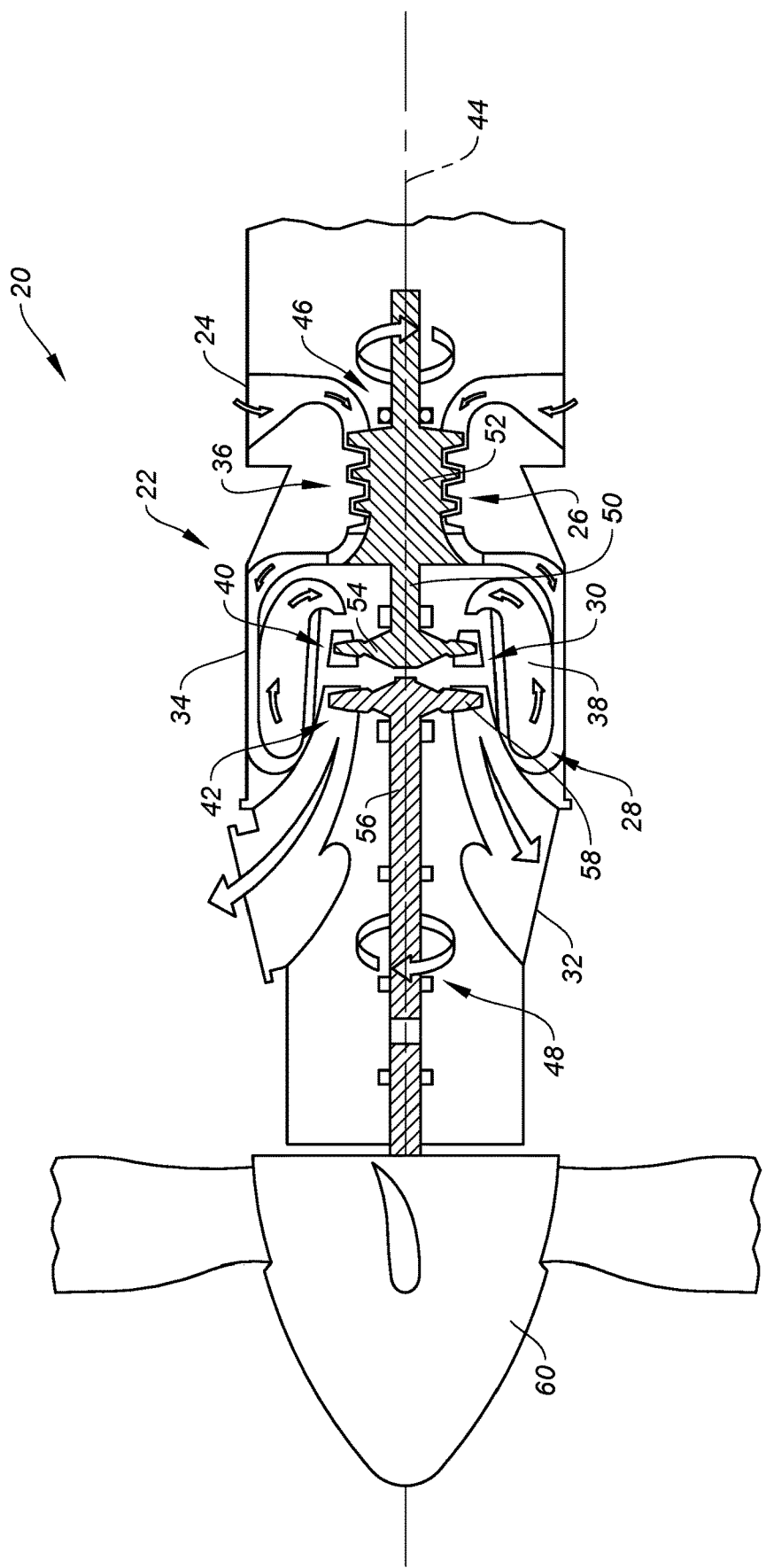
FIG. 2 illustrates a schematic, cutaway view of a propulsion system for an aircraft, in accordance with one or more embodiments of the present disclosure.

FIG. 2 is a schematic illustration of a configuration of the aircraft propulsion system 20. The propulsion system 20 of FIG. 2 includes a gas turbine engine 22. The gas turbine engine 22 of FIG. 2 is a turboprop gas turbine engine. While the following description and accompanying drawings may refer to the turboprop gas turbine engine of FIG. 2 as an example, it should be understood that aspects of the present disclosure may be equally applicable to other types of gas turbine engines including, but not limited to, a turboshaft gas turbine engine, a turbofan gas turbine engine, a turbojet gas turbine engine, a propfan gas turbine engine, or an open rotor gas turbine engine. Moreover, aspects of the present disclosure may be equally applicable to aircraft engines which are not gas turbine engines such as, but not limited to intermittent combustion engines (e.g., a reciprocating engine such as a piston engine or a rotary engine).

The gas turbine engine 22 of FIG. 2 includes an air inlet 24, a compressor section 26, a combustor section 28, a turbine section 30, an exhaust 32, and an engine static structure 34. The compressor section 28 includes a compressor 36. The combustor section 28 includes a combustor 38 (e.g., an annular combustor). The turbine section 30 includes a high-pressure turbine 40 and a power turbine 42. The gas turbine engine 22 sections 26, 28, 30 of FIG. 2 are sequentially arranged along an axial centerline 44 (e.g., a rotational axis) of the gas turbine engine 22. The engine static structure 34 may include, for example, one or more engine cases for the gas turbine engine 22. The engine static structure 34 may additionally include cowlings, bearing assemblies, or other structural components of the gas turbine engine 22. The engine static structure 34 houses and structurally supports the engine sections 26, 28, 30.

The gas turbine engine 22 of FIG. 2 further includes a first rotational assembly 46 (e.g., a high-pressure spool) and a second rotational assembly 48 (e.g., a power spool). The first rotational assembly 46 and the second rotational assembly 48 are mounted for rotation about the axial centerline 44 relative to the engine static structure 34.

The first rotational assembly 46 includes a first shaft 50, a bladed compressor rotor 52 for the compressor 36, and a bladed first turbine rotor 54 for the high-pressure turbine 40. The first shaft 50 interconnects the bladed compressor rotor 52 and the bladed first turbine rotor 54.

The second rotational assembly 48 includes a second shaft 56 and a bladed second turbine rotor 58 for the power turbine 42. The second shaft 56 may additionally be directly or indirectly connected to a propeller 60 of the propulsion system 20. For example, the second shaft 56 of FIG. 2 extends between and to the bladed second turbine rotor 58 and the propeller 60. Alternatively, the second shaft 56 may be connected to the propeller 60 by one or more gear assemblies (not shown) configured to drive the propeller 60 at a reduced rotational speed relative to the second shaft 56.

During operation of the propulsion system 20 of FIG. 2, ambient air enters the gas turbine engine 22 through the air inlet 24 and is directed through the engine sections 26, 28, 30 along a core flow path. The air within the core flow path may be referred to as "core air." The core air is compressed in the compressor 36 by the bladed first compressor rotor 52 and directed into a combustion chamber of the combustor 38. Fuel is injected into the combustion chamber and mixed with the compressed core air to provide a fuel-air mixture. This fuel-air mixture is ignited and combustion products thereof, which may be referred to as "core combustion gas," flow through and sequentially cause the bladed first turbine rotor 54 and the bladed second turbine rotor 58 to rotate. The rotation of the bladed first turbine rotor 54 and the bladed second turbine rotor 58 respectively drives rotation of the first rotational assembly 46 and the second rotational assembly 48. Rotation of the second rotational assembly 48 further drives rotation of the propeller 60 to provide propulsion for the aircraft 1000.

The gas turbine engine 22 is configured to use a hydrogen fuel in the combustion chamber to facilitate the combustion process. For example, the hydrogen may be mixed and burned in the combustor 38 with a second fuel such as kerosene or another jet fuel.

Figure 3:
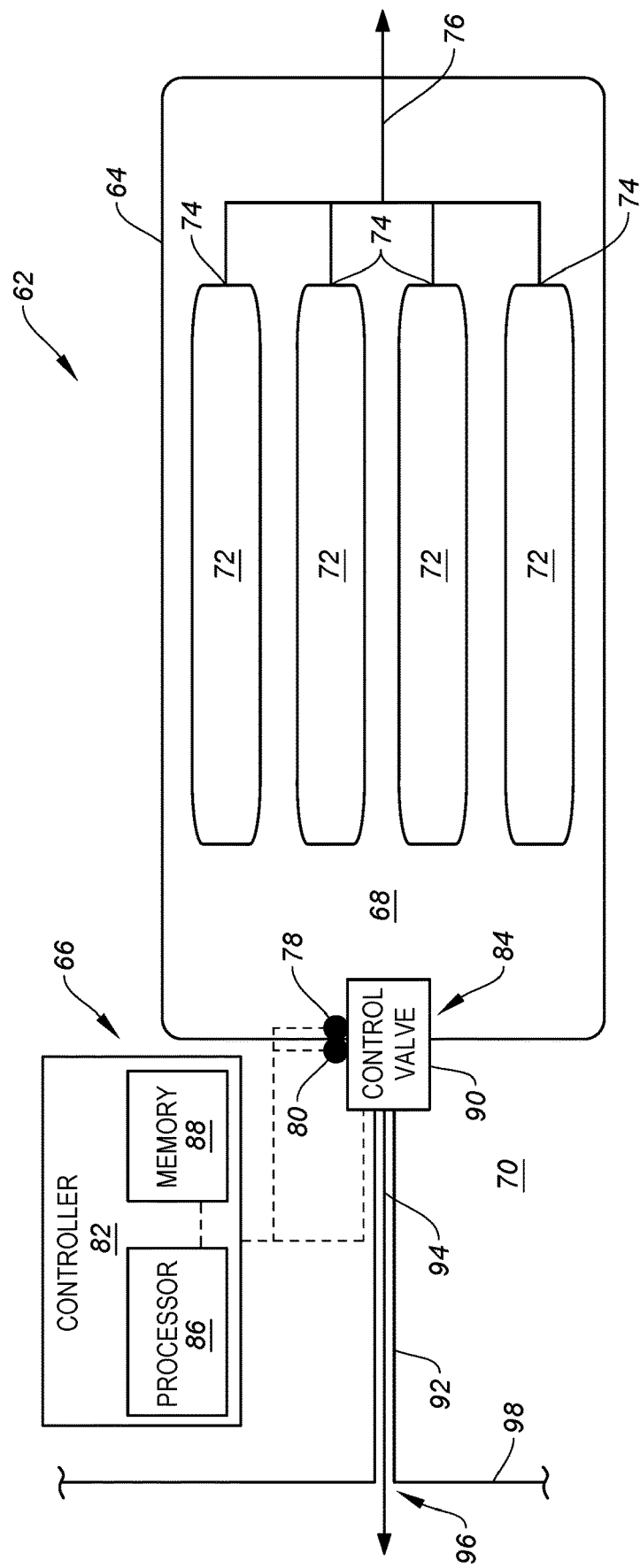
FIG. 3 schematically illustrates a hydrogen supply assembly for an aircraft, in accordance with one or more embodiments of the present disclosure.

Referring to FIG. 3, the propulsion system 20 (see FIGS. 1 and 2) includes or is otherwise connected in fluid communication with a hydrogen supply assembly 62. The hydrogen supply assembly 62 of FIG. 3 includes a storage housing 64 and a leak detection system 66. While the hydrogen supply assembly 62 is described herein for the propulsion system 20, it should be understood that aspects of the hydrogen supply assembly 62 may be equally applied to other applications such as, but not limited to, land-based hydrogen storage, hydrogen storage for hydrogen fuel cell systems, and the like. Moreover, aspects of the hydrogen supply assembly 62 may also be applicable to containment and leak detection of other stored fluids (e.g., volatile or explosive gases).

The storage housing 64 surrounds and forms a storage plenum 68. The storage housing 64 is configured to isolate, seal, contain, and/or separate the storage plenum 68 from the ambient atmosphere 70 external to the storage housing 64. The ambient atmosphere 70 may be formed by a compartment or other portion of the propulsion system 20 or the aircraft 1000 (see FIG. 1) within which the storage housing 64 is disposed. The storage housing 64 may be disposed, for example, on or within the propulsion system 20 or on or within the aircraft 1000 on which the propulsion system 20 is mounted (see FIG. 1).

The hydrogen supply assembly 62 further includes at least one hydrogen supply component disposed within the storage housing 64 coincident with the storage plenum 68. The hydrogen supply component is configured to store, contain, direct, or otherwise control hydrogen (e.g., gaseous hydrogen, liquid hydrogen, etc.) such that the hydrogen is contained within the hydrogen supply component and the hydrogen is not directed into or otherwise released into the storage plenum 68. For example, the hydrogen supply assembly 62 of FIG. 3 further includes one or more storage vessels 72 (e.g., canisters) disposed within the storage housing 64. The present disclosure, however, is not limited to hydrogen supply components configured for hydrogen storage. Examples of alternative hydrogen supply components include, but are not limited to, a hydrogen fuel cell unit, a hydrogen condensation unit, or the like. Each of the storage vessels 72 is configured to store a pressurized hydrogen fluid or a fluid mixture including a substantial quantity of hydrogen (e.g., liquid or gaseous hydrogen). Each of the storage vessels 72 includes a vessel outlet 74 connected in fluid communication with downstream components (e.g., hydrogen supply assembly 62 components, combustor fuel injection components, etc.) by a conduit 76 (e.g., a pipe, hose, tube, etc.). The conduit 76 extends through the storage housing 64 and is sealed with the storage housing 64 to isolate, seal, contain, and/or separate the storage plenum 68 from the ambient atmosphere 70. The storage vessels 72 (e.g., the vessel outlets 74) may be connected together in fluid communication by the conduit 76 within the storage housing 64 as shown, for example, in FIG. 3. However, the present disclosure is not limited to the foregoing exemplary configuration of the conduit 76 with the storage vessels 72.

The leak detection system 66 of FIG. 3 includes an interior pressure sensor 78, an exterior pressure sensor 80, and a controller 82. The leak detection system 66 may additionally include a purge assembly 84.

The interior pressure sensor 78 is configured to measure pressure within the storage plenum 68. The interior pressure sensor 78 may be disposed within the storage housing 64 or otherwise connected in fluid communication with the storage plenum 68. For example, the interior pressure sensor 78 may be mounted or otherwise disposed at (e.g., on, adjacent, or proximate) the storage housing 64 within the storage plenum 68. The interior pressure sensor 78 may be configured, for example, as a pressure transducer to generate an electrical or electronic signal output representative of a pressure of the storage plenum 68.

The exterior pressure sensor 80 is configured to measure pressure of the ambient atmosphere 70 surrounding the storage housing 64. The exterior pressure sensor 80 may be disposed outside the storage housing 64 or otherwise connected in fluid communication with the ambient atmosphere 70. For example, the exterior pressure sensor 80 may be mounted or otherwise disposed at (e.g., on, adjacent, or proximate) an exterior of the storage housing 64. The exterior pressure sensor 80 may be configured, for example, as a pressure transducer to generate an electrical or electronic signal output representative of a pressure ambient atmosphere 70. The interior pressure sensor 78 and the exterior pressure sensor 80 may be discrete pressure sensors configured to measure the storage plenum 68 pressure and the ambient atmosphere 70 pressure, respectively. Alternatively, the interior pressure sensor 78 and the exterior pressure sensor 80 may be formed by a single pressure sensor unit configured, for example, to measure a differential pressure between the storage plenum 68 and the ambient atmosphere 70.

The controller 82 includes a processor 86 connected in signal communication with memory 88. The processor 86 may include any type of computing device, computational circuit, processor(s), CPU, computer, or the like capable of executing a series of instructions that are stored in the memory 88. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the leak detection system 66 and its components to accomplish the same algorithmically and/or by coordination of the leak detection system 66 components. The memory 88 may include a single memory device or a plurality of memory devices (e.g., a computer-readable storage device that can be read, written, or otherwise accessed by a general purpose or special purpose computing device), including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 82. The controller 82 is connected in communication (e.g., signal communication) with the interior pressure sensor 78 and the exterior pressure sensor 80. The controller 82 may include, or may be in communication with, an input device that enables a user to enter data and/or instructions, and may include, or be in communication with, an output device configured, for example to display information (e.g., a visual display or a printer), or to transfer data, etc. Communications between the controller 82 and other electrical and/or electronic components (e.g., controllers, sensors, etc.) may be via a hardwire connection or via a wireless connection. A person of skill in the art will recognize that portions of the controller 82 may assume various forms (e.g., digital signal processor, analog device, etc.) capable of performing the functions described herein.

The controller 82 may form or otherwise be part of an electronic engine controller (EEC) for the gas turbine engine 22. For example, the EEC may control operating parameters of the gas turbine engine 22 such as, but not limited to, fuel flow, stator vane position (e.g., variable compressor inlet guide vane (IGV) position), compressor air bleed valve position, shaft (e.g., first shaft 50 and/or second shaft 56) torque and/or rotation speed, etc. so as to control an engine power or performance of the gas turbine engine 22. The EEC may modulate fuel flow to the combustor 38 to obtain a desired output power of the gas turbine engine 22. In some embodiments, the EEC may be part of a full authority digital engine control (FADEC) system for the propulsion system 20.

The purge assembly 84 includes a control valve 90 and a purge conduit 92. The control valve 90 is connected in fluid communication with the storage plenum 68 and the purge conduit 92. The control valve 90 may be mounted on the storage housing 64. The control valve 90 is positionable in a closed position and an open position. In the closed position, the control valve 90 isolates the purge conduit 92 from the storage plenum 68 to isolate, seal, contain, and/or separate the storage plenum 68 from the ambient atmosphere 70 external to the storage housing 64. In the open position, the control valve 90 is configured to direct fluid 94 (e.g., air, hydrogen, and combinations thereof) to the purge conduit 92. The control valve 90 is connected in communication (e.g., signal communication) with the controller 82. The control valve 90 may be configured as a solenoid-operated valve or another remotely-controlled valve configured to be controlled by the controller 82 for positioning in the open position or the closed position. The purge conduit 92 (e.g., a pipe, hose, tube, etc.) extends between and to the control valve 90 and a distal end 96. With the control valve 90 in the open position, the purge conduit 92 is configured to direct (e.g., purge) the fluid 94 from the storage plenum 68 to the distal end 96 and exhaust the fluid 94 from the distal end 96. The purge conduit 92 may extend through a housing 98 (e.g., nacelle, fuselage, wing, etc.) of the propulsion system 20 and/or the aircraft 1000 to direct the exhaust the fluid 94 from the distal end 96 outside the propulsion system 20 and/or the aircraft 1000. Alternatively, for example, the purge conduit 92 may be configured to exhaust the fluid 94 from the distal end 96 to the ambient atmosphere 70.

During operation of the hydrogen supply assembly 62, the hydrogen supply assembly 62 is configured to store the hydrogen or to supply hydrogen from the storage vessels 72 is directed through the conduit 76 and out of the storage housing 64 (e.g., for combustion in the combustor 38; see FIG. 2). During normal operation of the hydrogen supply assembly 62, no or substantially no hydrogen is expected to flow from the storage vessels 72 or the conduit 76 into the storage plenum 68. In some rare circumstances, some amount of the hydrogen may leak from the storage vessels 72 or the conduit 76 into the storage plenum 68.

The controller 82 is configured to identify a presence or an absence of leakage of hydrogen into the storage plenum 68 using the interior pressure sensor 78 and the exterior pressure sensor 80. The controller 82 may determine a differential pressure between the storage plenum 68 and the ambient atmosphere 70 (e.g., using the interior pressure sensor 78 and the exterior pressure sensor 80) and compare the determined differential pressure to a differential pressure threshold. The controller 82 may identify a hydrogen leak into the storage plenum 68 when the determined differential pressure is greater than or equal to the differential pressure threshold. For example, the determined differential pressure may identify that the measured pressure within the storage plenum 68 is greater than the measured pressure of the ambient atmosphere 70 by an amount which exceeds the differential pressure threshold.

The present disclosure is not limited to any particular value of the differential pressure threshold for identifying the presence of a hydrogen leak to the storage plenum 68. The value of the differential pressure threshold may be selected, for example, to reduce the likelihood of incorrectly identifying the presence of hydrogen leakage based on factors such as, but not limited to, instrument (e.g., the interior pressure sensor 78 and exterior pressure sensor 80) error or expected fluctuations in localized temperatures at the storage housing 64. The value of the differential pressure threshold may additionally or alternatively be selected based on a pressure containment capability of the storage housing 64. For example, embodiments of the hydrogen supply assembly 62 for aircraft (e.g., the aircraft 1000; see FIG. 1) may include a relatively lower-weight storage housing 64 having a lower pressure containment capability. In this case, a relatively lower value of the differential pressure threshold may be selected to identify leakage before pressure of the storage plenum 68 approaches the pressure containment capability of the storage housing 64. In contrast, embodiments of the hydrogen supply assembly 62 for land-based storage of hydrogen or other fluids may include a relatively higher-weight storage housing 64 having a greater pressure containment capability and, therefore, a relatively higher value of the differential pressure threshold may be selected.

Routine experimentation and/or analysis may be performed by a person of ordinary skill in the art to determine suitable values of the differential pressure threshold for a particular supply assembly application, in accordance with and as informed by one or more aspects of the present disclosure.

In response to identifying the presence of leakage of hydrogen into the storage plenum 68, the controller 82 may generate a warning (e.g., an audible alarm, a warning light, a warning message, etc.) for a pilot or other operator of the aircraft 1000 (see FIG. 1). The warning may inform the pilot or other operator of the identification of hydrogen leakage within the storage housing 64. The controller 82 may additionally or alternatively schedule or otherwise identify a maintenance intervention to inspect and/or repair components of the hydrogen supply assembly 62.

In some embodiments, the controller 82 may additionally initiate or prompt a purge of the storage plenum 68, for example, using the purge assembly 84. In response to identification of the presence of hydrogen leakage into the storage plenum 68 when the determined differential pressure exceeds the differential pressure threshold, the controller 82 may control (e.g., autonomously control) the control valve 90 to position to the open position to direct the fluid 94 (e.g., leaked hydrogen mixed with air or other gas) within the storage plenum 68 through the control valve 90 and the purge conduit 92 to purge the storage plenum 68. Alternatively, the controller 82 may prompt a pilot or other operator of the aircraft 1000 (see FIG. 1) to purge the storage plenum 68, for example, by remotely operating the control valve 90. The controller 82 may initiate or prompt a purge of the storage plenum 68 in response to identifying the determined differential pressure exceeds a second differential pressure threshold. The second differential pressure threshold may be higher than the differential pressure threshold for identifying the presence or the absence of hydrogen leakage to the storage plenum 68.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A hydrogen supply assembly for an aircraft propulsion system, the hydrogen supply assembly comprising:
   a storage housing surrounding and forming a storage plenum;
   a hydrogen supply component disposed within the storage housing coincident with the storage plenum; and
   a leak detection system including an interior pressure sensor, an exterior pressure sensor, a purge assembly, and a controller, the interior pressure sensor is connected in fluid communication with the storage plenum, the exterior pressure sensor is connected in fluid communication with an ambient atmosphere outside the storage housing, the purge assembly including a control valve mounted on the storage housing, the control valve connected in fluid communication with the storage plenum, the control valve positionable in a closed position and an open position, the control valve is configured to purge the storage plenum in the open position, and the controller includes a processor in communication with a non-transitory memory storing instructions, which instructions when executed by the processor, cause the processor to:

determine a differential pressure between the storage plenum and the ambient atmosphere with the interior pressure sensor and the exterior pressure sensor; and identify a presence or an absence of hydrogen leakage from the hydrogen supply component to the storage plenum by comparing the determined differential pressure to a first differential pressure threshold, the presence of hydrogen leakage identified by the determined differential pressure greater than or equal to the differential pressure threshold.

2. The hydrogen supply assembly of claim 1, wherein the instructions, when executed by the processor, further cause the processor to generate a warning in response to identifying the presence of the hydrogen leakage from the hydrogen supply component to the storage plenum.

3. The hydrogen supply assembly of claim 1, wherein the controller is connected in communication with the control valve and the instructions, when executed by the processor, further cause the processor to control the control valve in the open position to purge the storage plenum when the determined differential pressure is greater than a second differential pressure threshold.

4. The hydrogen supply assembly of claim 3, wherein the second differential pressure threshold is greater than the first differential pressure threshold.

5. The hydrogen supply assembly of claim 1, wherein the instructions, when executed by the processor, further cause the processor to generate a prompt for an operator to open the control valve to purge the storage plenum when the determined differential pressure is greater than a second differential pressure threshold.

6. The hydrogen supply assembly of claim 1, wherein the hydrogen supply component includes at least one hydrogen storage vessel.

7. The hydrogen supply assembly of claim 1, wherein the interior pressure sensor and the exterior pressure sensor are mounted to the storage housing.

8. A propulsion system for an aircraft, the propulsion system comprising:
an engine including a combustor;
a storage housing surrounding and forming a storage plenum;
at least one hydrogen storage vessel disposed within the storage housing coincident with the storage plenum, and the at least one hydrogen storage vessel is configured to supply hydrogen from the at least one hydrogen storage vessel to the combustor for combustion; and
a leak detection system including a differential pressure sensor, a purge assembly, and a controller, the differential pressure sensor is configured to measure a differential pressure between the storage plenum and an ambient atmosphere outside the storage housing, the purge assembly including a control valve and a purge conduit, the control valve mounted on the storage housing, the control valve connected in fluid communication with the storage plenum, the control valve positionable in a closed position and an open position, and the control valve is configured to purge the storage plenum in the open position through the purge conduit, and the controller includes a processor in communication with a non-transitory memory storing instructions, which instructions when executed by the processor, cause the processor to:
determine the differential pressure between the storage plenum and the ambient atmosphere; and
identify a presence or an absence of hydrogen leakage from the at least one hydrogen storage vessel to the storage plenum by comparing the determined differential pressure to a first differential pressure threshold, the presence of hydrogen leakage identified by the determined differential pressure greater than or equal to the first differential pressure threshold.

9. The propulsion system of claim 8, wherein the instructions, when executed by the processor, further cause the processor to generate a warning for a pilot of the aircraft in response to identifying the presence of the hydrogen leakage from the at least one hydrogen storage vessel to the storage plenum.

10. The propulsion system of claim 8, wherein the purge conduit is configured to purge the storage plenum to an exterior of the propulsion system or the aircraft.

11. The propulsion system of claim 8, wherein the instructions, when executed by the processor, further cause the processor to generate a prompt for a pilot of the aircraft to open the control valve to purge the storage plenum when the determined differential pressure is greater than a second differential pressure threshold.

12. The propulsion system of claim 11, wherein the second differential pressure threshold is greater than the first differential pressure threshold.

13. A hydrogen supply assembly for an aircraft propulsion system, the hydrogen supply assembly comprising:
a storage housing surrounding and forming a storage plenum;
a hydrogen supply component disposed within the storage housing coincident with the storage plenum; and
a leak detection system including an interior pressure sensor, an exterior pressure sensor, and a purge assembly, the interior pressure sensor is connected in fluid communication with the storage plenum, the exterior pressure sensor is connected in fluid communication with an ambient atmosphere outside the storage housing, the purge assembly includes a control valve mounted on the storage housing, the control valve is connected in fluid communication with the storage plenum, the control valve is positionable in a closed position and an open position, and the control valve is configured to purge the storage plenum in the open position.

14. The hydrogen supply assembly of claim 13, wherein the hydrogen supply component includes at least one hydrogen storage vessel.

15. The hydrogen supply assembly of claim 13, wherein the interior pressure sensor and the exterior pressure sensor are mounted to the storage housing.

16. The hydrogen supply assembly of claim 13, wherein the leak detection system further includes a controller, the controller is connected in communication with the control valve, and the controller includes a processor in communication with a non-transitory memory storing instructions, which instructions when executed by the processor, cause the processor to:
determine a differential pressure between the storage plenum and the ambient atmosphere with the interior pressure sensor and the exterior pressure sensor; and
control the control valve in the open position to purge the storage plenum when the determined differential pressure is greater than a differential pressure threshold.

17. The hydrogen supply assembly of claim 13, wherein the leak detection system further includes a controller, the controller is connected in communication with the control valve, and the controller includes a processor in communication with a non-transitory memory storing instructions, which instructions when executed by the processor, cause the processor to:
  determine a differential pressure between the storage plenum and the ambient atmosphere with the interior pressure sensor and the exterior pressure sensor; and
  generate a prompt for an operator to open the control valve to purge the storage plenum when the determined differential pressure is greater than a differential pressure threshold.

18. The hydrogen supply assembly of claim 13, wherein the control valve is configured to purge the storage plenum to the ambient atmosphere in the open position.

* * * * *